(12) United States Patent
Zhou et al.

(10) Patent No.: US 7,857,887 B2
(45) Date of Patent: Dec. 28, 2010

(54) ENVIRONMENT-FRIENDLY NON-NOISE MATTE GRANULATION TECHNIQUE

(75) Inventors: Songlin Zhou, Shandong (CN); Weidong Liu, Shandong (CN)

(73) Assignee: Xiangguang Copper Co., Ltd., Shifo Town, Yanggu County, Liaocheng, Shandong Province (CN)

( * ) Notice: Subject to any disclaimer, the term of this patent is extended or adjusted under 35 U.S.C. 154(b) by 80 days.

(21) Appl. No.: 12/340,697

(22) Filed: Dec. 20, 2008

(65) Prior Publication Data

US 2010/0154941 A1 Jun. 24, 2010

(51) Int. Cl.
*C22B 7/04* (2006.01)
*C22B 15/14* (2006.01)

(52) U.S. Cl. .......................... 75/338; 75/643

(58) Field of Classification Search .......... 75/643, 75/338
See application file for complete search history.

(56) References Cited

U.S. PATENT DOCUMENTS 2,159,433 A * 5/1939 Ervin ................ 75/337
RE36,598 E * 3/2000 George ............. 75/586

FOREIGN PATENT DOCUMENTS

JP 2008045002 A * 2/2008
WO WO 9854103 A1 * 12/1998

OTHER PUBLICATIONS

Machine translation of JP 2008-0450002 A, published Feb. 2008.*
Derwent Acc No. 1972-68055T for DD 91902 A (abstract) published Jul. 1971.*

* cited by examiner

*Primary Examiner*—George Wyszomierski
*Assistant Examiner*—Tima M McGuthry-Banks
(74) *Attorney, Agent, or Firm*—Global IP Services; Tianhua Gu

(57) ABSTRACT

The invention makes public an environment-friendly non-noise matte granulation technique. Melted matte flows out from the chute, then gas is sprayed on the matte through spray facilities; the gas disperses the melted matte into a large amount of tiny liquid drops, and cools the dispersed tiny drops to semi-melted or solid copper grains; in the following dropping course, the copper grains are quenched by pressurized cold water; finally, copper grains drop to the cold-water pond along with the pressurized cold water for further cooling, and the produced sand-like mattes are sent to the next procedure through dehydration-and-transportation system. It can overcome explosion and prevent chemical reaction in quenching, reduce noise pollution, and has the properties of simple procedure and easy operation to settle the problems existed in water quenching of matte.

8 Claims, 2 Drawing Sheets

ENVIRONMENT-FRIENDLY NON-NOISE MATTE GRANULATION TECHNIQUE

FIELD OF THE INVENTION

Figure 1:
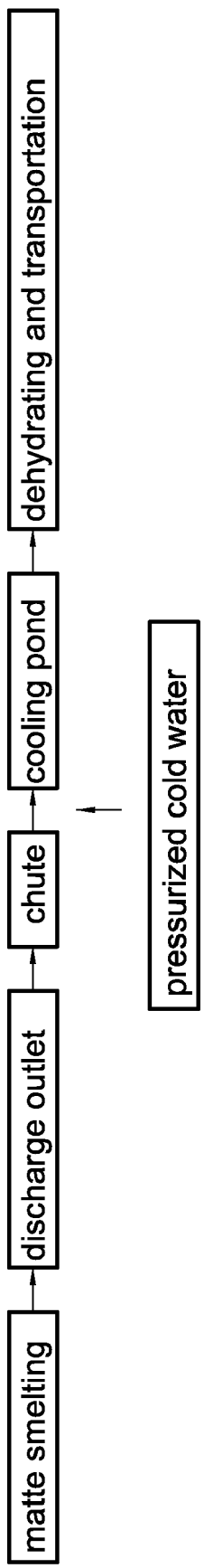

The invention is involved in granulation treatment of melting materials in metallurgy industry, and is particularly applicable for high-temperature melted matte and granulation of metallurgic slag.

BACKGROUND OF THE INVENTION

With the application, development and optimization of "double flashes" (flash melting and flash converting) copper-refining technique, which works as an environment-friendly and high-efficiency process, granulation of high-temperature melted matte and converting slag will come to be a component indispensable in copper smelting. The technological base of matte granulation method at present is to quench the high-temperature melted matte with pressurized cold water directly. Given that the high-temperature melted matte contacts water directly, during the course of rapid vaporization and expansion, there will be chemical reaction, and explosion will occur in quenching (in custom called matte blasting). Many negative influences will be brought by matte blasting: first, seriously threaten operation security; second, cause noise pollution; third, $SO_2$ or $H_2S$, the chemical reaction products, will erode the equipments; fourth, bring forward too many fine mattes, of which, some will stay in water system and abrade the equipments, even some will be lost with vapor venting and pollute the environment.

SUMMARY OF THE INVENTION

The purpose of the invention is to provide an environment-friendly non-noise matte granulation technique, which, with the properties of simple process and easy operation to settle the problems existed in water quenching of the matte, can overcome explosion and prevent chemical reaction in quenching, reduce noise pollution.

Following technological scheme is adopted to realize the purpose: environment-friendly non-noise matte granulation technique; after melted mattes is led out through a chute, gas is sprayed by gas-spray facilities to the mattes; ejected gas disperse the melted mattes flowing down through the chute into large amounts of tiny drops, and at the same time, the gas mentioned above cools the dispersed tiny drops to semi-melting or solid copper grains; on the following dropping course, the copper grains are quenched by pressurized cold water; finally, copper grains drop to the cold-water pond along with the pressurized cold water for further cooling, and the produced sand-like mattes are sent to the next procedure through dehydration-and-transportation system.

To further realize the purpose of the invention, technological scheme as follows can also be adopted: the stated gas spray facilities are scattered sprayers, which are installed beneath the chute; melted mattes are led to granulator through the chute; the gas disperses melted matte through sprayers in the granulator; dispersed mattes are cooled in cooling pond after being quenched by pressurized cold water; produced sand-like mattes are sent to the next procedure through dehydration-and-transportation system; stirring sprayers are installed in cooling pond; pressurized cold water is sprayed from stirring sprayers to conduct stirring heat-exchange, and the produced steam is discharged to ambient air through discharge chimney; the stated gas is a pressurized one not react with melted mattes, and pressurized gas is low-pressure saturated vapor, with gas pressure 0.2 MPa-3.0 MPa; cleaning facility is installed at the bottom end of the chute, and the cleaning facilities are a hydraulic cylinder, gas-operated device or electricity-operated device.

Principles of above technique are as follows: the current matte granulation method is to quench the high-temperature melted matte discharged through the chute with pressurized cold water; given industrial matte is mainly composed of $Cu_2S$ and $FeS$, following reactions will occur while they directly contact water in high-temperature melting state:

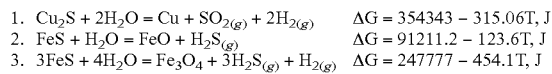

1. $Cu_2S + 2H_2O = Cu + SO_{2(g)} + 2H_{2(g)}$    $\Delta G = 354343 - 315.06T$, J
2. $FeS + H_2O = FeO + H_2S_{(g)}$    $\Delta G = 91211.2 - 123.6T$, J
3. $3FeS + 4H_2O = Fe_3O_4 + 3H_2S_{(g)} + H_{2(g)}$    $\Delta G = 247777 - 454.1T$, J Produced flammable gases $H_2S$ and $H_2$ will also react with oxygen in air:

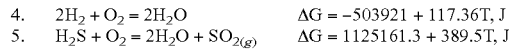

4. $2H_2 + O_2 = 2H_2O$    $\Delta G = -503921 + 117.36T$, J
5. $H_2S + O_2 = 2H_2O + SO_{2(g)}$    $\Delta G = 1125161.3 + 389.5T$, J The reactions above are heat-emitting and volume-increasing ones with rapid reaction speed. Because of high intensity of the reactions, heat-emission is extremely quick, and the system can not release the heat in available time, to see a severe local temperature rising; simultaneously, high-temperature melted materials contact with water, causing rapid vaporization of the water and volume-expansion. Vaporizing expansion and the high-pressure gas produced in reactions can not be diffused timely, and very high pressure will be produced during compressing; when the pressure makes the gas diffuse in a high speed, explosion-an phenomenon of energy releasing of high-temperature and high-pressure gas flow in short time-will occur. Noise caused by the explosion will exceed 110 dB on operation site, and the higher the temperature of the matte is, the more serious the noise pollution will be. Blast wave from it will disperse and crack melted matte and the sand-like matte that has been cold and solidified, producing fine grains and making collection difficult; the fine matte can even be carried away by powerful gas flow to cause materials loss and environment pollution; reaction product $SO_2$ or $H_2S$ will make the water in the system acidified, seriously damage the equipments and it will demand a large amount of alkali to maintain water quality.

The non-noise granulation technique of matte, put forward in the invention, is to prevent chemical reaction in quenching, reduce vaporizing expansion, eliminate explosion, and lower noise pollution. After being discharged through the chute, high-temperature melted matte is dispersed into fine liquid drops by low-pressure saturated vapor or compressed gas before it meets water in air, so as to increase heat-dissipating surface area and prolong heat-dissipating time. The surface will be solidified or reduced to 1200° C., and then the initially-formed matte drops to water pond, which is stirred by pressurized cold water, to conduct cooling and collection.

From $\Delta G$ in equations (1), (2) and (3), we can see that temperature of the matte will greatly affect the direction and speed of the reactions. With the drop of temperature, $\Delta G$ will rise, and from the view of thermodynamics, temperature drop is unfavorable for the reactions; from the view of dynamics, temperature drop will slow down the reactions, and even prevent their occurrence, given that the matte has been dispersed and cooled before contacting with water; meanwhile, when the matte drops to stirring water after being dispersed, the amount of water is relatively increased, and it will effectively reduce the possibility of explosion caused by local vaporizing expansion.

Positive effects of the invention are: 1. Prevent chemical reaction during quenching, reduce vaporizing expansion, eliminate explosion, lower spot noise pollution to less than 80 dB, and optimize working condition; 2. Improve quality of sand-like matte, to see that of 1-5 mm covers more than 85%, and that smaller than 200 screen mesh covers less than 1%; 3. Simple process, convenient operation, high security and reliability, less investment.

BRIEF DESCRIPTION OF THE INVENTION

Figure 2:
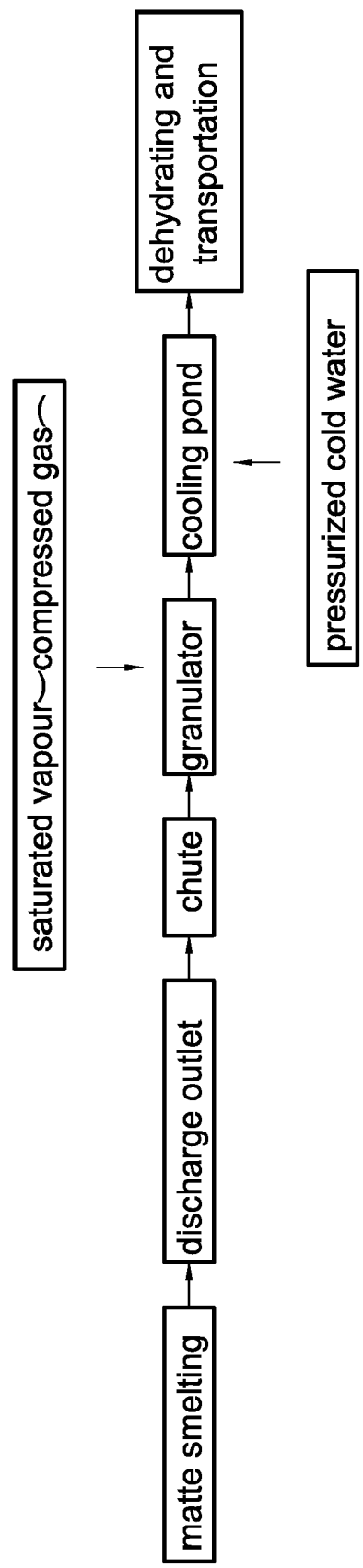
Figure 3:
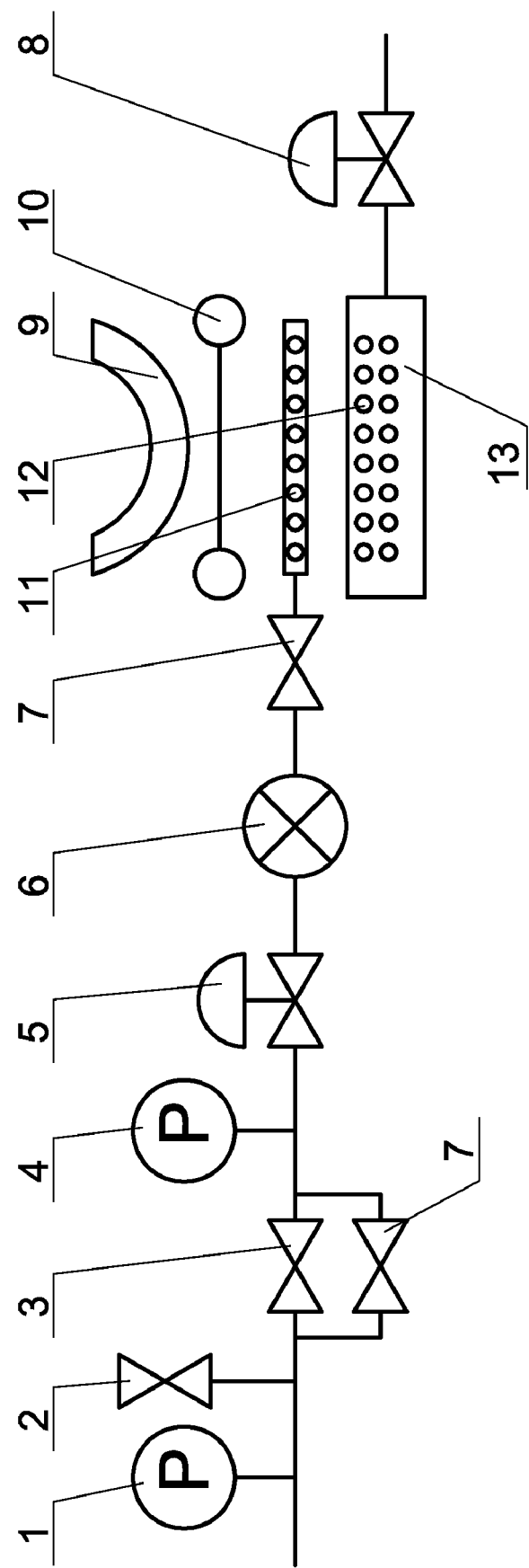

FIG. 1 is the process flow of current technique.
FIG. 2 is the process flow of the invention.
FIG. 3 is the illustrative diagram of the invention, with the tabs as: $1.1^{st}$ pressure gauge 2. safety valve 3. pressure regulating valves $4.2^{nd}$ pressure gauge 5. regulatory valve 6. flow meter 7. manual valve 8. gas-driving valve 9. chute 10. cleaning facilities 11. dispersing sprayer 12. stirring sprayer 13. Cooling pond.

DETAILED DESCRIPTION OF THE INVENTION

In the matte granulation technique stated in the invention, melted matte flows out from the chute (9), then gas is sprayed on the matte through spray facilities; the gas disperses the melted matte into large amounts of tiny liquid drops, and cools the dispersed tiny drops to semi-melted or solid copper grains; on the following dropping course, the copper grains are quenched by pressurized cold water; finally, copper grains drop to the cold-water pond along with the pressurized cold water for further cooling, and the produced sand-like mattes are sent to the next procedure through dehydration-and-transportation system.

The spray facility can be dispersing sprayer 11 that can be installed beneath the chute 9, or on the downside, bilateral and upside of the melted matte, but all these should ensure that before contacting with pressurized cold water, the melted matte is dispersed and pre-cooled by pressurized saturated vapor or compressed gas. To ensure the effect of gas dispersing and pre-cooling of melted matte, the matte is firstly led to granulator through chute 9. The matte is dispersed by gas in the granulator through dispersing sprayer 11, and then the dispersed matte is cooled in cooling pond after being quenched by pressurized cold water; produced sand-like matte is sent to the next procedure through dehydration-and-transportation system.

To accelerate heat exchange and prevent re-combination of the semi-melted matte, stirring sprayer 12 is installed in cooling pond, 13, from which pressurized cold water is sprayed to conduct stirring heat exchange, and the produced vapor is discharged to atmosphere through venting chimney.

The stated gas is a pressurized one not reacts with melted matte, and the pressurized gas is low-pressure saturated vapor or compressed air.

Repeated experiments indicates that when the pressure of low-pressure saturated vapor or compressed air is 0.2 MPa-3.0 MPa, effect of dispersing and pre-cooling of melted matte will be the best.

After a period of operation, normal operation will be affected by some icicle-like copper rods at the outlet of chute 9. Cleaning facility 10, which may be hydraulic cylinder, is installed at the bottom of the chute. When the sticking is serious, hydraulic cylinder will be operated to cut the copper rods on chute 9 and resume operation.

Normal operation process is as follows: melted matte is led to granulator after being discharged from outlet; pressure of saturated vapor or compressed gas is reduced to 0.2 MPa-1.6 MPa through pressure-regulating valve 3; adjust the flow rate of saturated vapor or compressed gas according to that of the matte, e.g. when flow rate of the matte is 0.3 t/min-10 t/min with temperature 1150° C.-1350° C., the flow rate of saturated vapor or compressed gas is controlled at 500 Nm/h-5000 Nm/h through regulating valve 5; the vapor or gas is jetted out from dispersing sprayer 11 to disperse and pre-cool melted matte. Dispersed matte is cooled in cooling pond by pressurized cold water through stirring heat exchange with water pressure 0.1 MPa-0.7 MPa, and water/slag ratio should be 5-20. Produced steam is discharged through venting chimney, and sand-like matte sent to the next procedure through dehydration-and-transportation system.

All the technological content that not described here for detail is public-known.

What is claimed is:

1. Environment-friendly non-noise matte granulation method comprising following processes:
   melted matte flows out from a chute, and then gas is sprayed on the matte through spray facilities;
   the gas disperses the melted matte into a large amount of tiny liquid drops, and cools the tiny liquid drops to semi-melted or solid copper grains;
   in following dropping course, the matte grains are quenched by pressurized cold water;
   finally, the matte grains drop to a cold-water pond along with the pressurized cold water for further cooling and become sand-like mattes, which are sent to next process through a dehydration-and-transportation system;
   stirring sprayers are installed in the cooling pond, pressurized cold water is sprayed from the stirring sprayers to conduct stirring heat-exchange, and produced steam is discharged to ambient air through a discharge chimney.

2. The environment-friendly non-noise matte granulation method of claim 1, wherein the spray facilities are scattered sprayers, which are installed beneath the chute; melted matte is led through the chute; the gas is through the scattered sprayers to disperse the melted matte; dispersed matte is cooled in the cooling pond while being quenched by pressurized cold water.

3. The environment-friendly non-noise matte granulation method of claim 1, wherein the gas is pressurized and inert with the melted matte, and the gas can be low-pressure saturated vapor.

4. The environment-friendly non-noise matte granulation method of claim 2, wherein the gas is pressurized and inert with the melted matte, and the gas can be low-pressure saturated vapor.

5. The environment-friendly non-noise matte granulation method of claim 3, wherein the gas pressure is 0.2MPa-3.0MPa.

6. The environment-friendly non-noise matte granulation method of claim 4, wherein the gas pressure is 0.2MPa-3.0MPa.

7. The environment-friendly non-noise matte granulation method of claim 1, wherein a cleaning facility is installed at a bottom end of the chute, and the cleaning facility is a hydraulic cylinder.

8. The environment-friendly non-noise matte granulation method of claim 2, wherein a cleaning facility is installed at a bottom end of the chute, and the cleaning facility is a hydraulic cylinder.

* * * * *